United States Patent

McGinnis

[15] 3,647,392
[45] Mar. 7, 1972

[54] CARBON DIOXIDE SENSOR

[72] Inventor: Gerald E. McGinnis, Pittsburgh, Pa.
[73] Assignee: Westinghouse Electric Corporation, Pittsburgh, Pa.
[22] Filed: Jan. 27, 1967
[21] Appl. No.: 612,119

[52] U.S. Cl. ............................ 23/254 E, 23/232 E, 23/255 E
[51] Int. Cl. .......................................................... G01n 27/50
[58] Field of Search ............. 23/232, 254, 255, 254 E, 255 E, 23/232 E

[56] References Cited

UNITED STATES PATENTS 3,347,767  10/1967  Hickam ................................. 204/195
2,310,472  2/1943   Sullivan ............................... 23/255 E

OTHER PUBLICATIONS

Modern Lab. Appliances, Fisher 63, 1962. Page 558.
Dieterly et al., NASA Doc. NG2-11085 (1962), pages 7, 8, 15, 41, 42, and 43 relied on.
Dieterly, D. K., et al., Chem. Abstr. 59, 13577h (1963).

*Primary Examiner*—Morris O. Wolk
*Assistant Examiner*—R. M. Reese
*Attorney*—F. H. Henson, E. P. Klipfel and D. Schron

[57] ABSTRACT

The carbon dioxide in a sample of gas to be tested is reacted with potassium superoxide resulting in a related increase of oxygen. The increase in oxygen over that of the original sample is determined in a differential oxygen gauge which compares the partial pressure of oxygen in the original sample with the partial pressure of oxygen in the modified sample including the increased amount of oxygen from the reaction.

7 Claims, 5 Drawing Figures

PATENTED MAR 7 1972 3,647,392

WITNESSES:
Bernard R. Gieguey
James F. Young

INVENTOR
Gerald E. McGinnis
BY Dean Schron
ATTORNEY

CARBON DIOXIDE SENSOR

BACKGROUND OF THE INVENTION

1. Field of the Invention

A need exists for carbon dioxide sensors in the chemical industry for determining the carbon dioxide content of gases involved in various chemical reactions in order to precisely control those reactions.

In the medical field, carbon dioxide monitoring involves the use of not only sensors for monitoring the carbon dioxide associated with an individual but also the carbon dioxide associated with a group of individuals such as in medical hyperbaric chambers wherein operations may be performed under precisely controlled atmospheric conditions.

Other closed atmospheric systems which demand accurate and reliable carbon dioxide sensors include the underseas and aerospace fields wherein the carbon dioxide content of an underwater habitat, rocket ship, or other extra terrestrial habitats must be known. Where individual excursions from these living quarters must be made, there exists a need for an extremely small and rugged carbon dioxide sensor to monitor the carbon dioxide in the breathing system of one individual.

2. Description of the Prior Art

A number of carbon dioxide sensors are available for continuous monitoring service. The sensors are variously based upon phenomena such as thermal conductivity, infrared absorption, mass spectroscopy, or electrochemistry. For closed atmospheric systems the need exists for a sensor having the characteristics of small size, simplicity, stability, and ease of calibration. Although some of the prior art devices meet some of these requirements, there is no sensor having all of these desirable features.

SUMMARY OF THE INVENTION

Briefly, apparatus for determining the carbon dioxide content of a gas includes means for obtaining a sample of the gas to be tested. Included in the apparatus are means responsive to the carbon dioxide in the test sample for providing a related amount of oxygen in a comparison gas. The resulting increase in oxygen is correlated directly with the initial carbon dioxide content of the sample. In the preferred embodiment the comparison gas is compared with the original sample in a differential-type oxygen gauge (i.e., one which senses the difference in partial pressures of oxygen of two input gases).

DRAWINGS

DESCRIPTION OF THE PREFERRED EMBODIMENT

Figure 1:
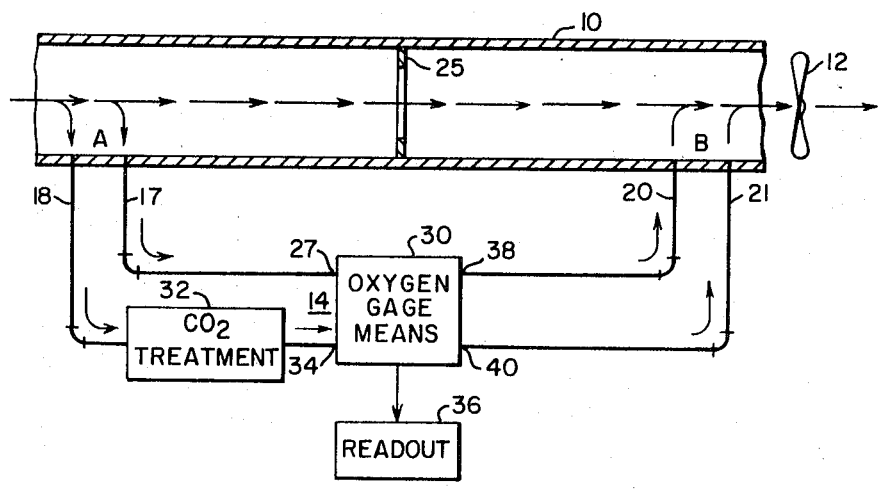
FIG. 1 is a partial sectional diagram-partial block diagram illustrating an embodiment of the present invention.

Although the apparatus herein may be utilized for measuring the carbon dioxide content of exhaust gases of various chemical processes, it will be described with respect to a closed atmospheric system and accordingly in FIG. 1 there is provided means for obtaining a sample of the gas in the system and includes a duct or passageway 10 through which a small portion of the gas in the system is conducted by means of, for example, a fan 12. Other means for causing a flow of gas through the passageway 10 may be utilized, and if the apparatus is carried by an individual with a closed breathing system, the motive force may be the individual's inhalation or exhalation.

The sample of gas in the passageway 10 may be conducted through the analysis section indicated by the general reference numeral 14 by means of first and second conduits 17 and 18, after which analysis, gases may be returned to the passageway 10 by other gas conduit means such as third and fourth conduits 20 and 21. One method of accomplishing this flow is by the establishment of a pressure differential between points A and B and may be conveniently provided by the inclusion of restriction 25 within the passageway 10.

Basically, the analysis section 14 includes a carbon dioxide treatment means which in effect removes the carbon dioxide in a test sample of the gas and replaces it with a related amount of oxygen; the increased oxygen content is compared with the original sample and since the increase in oxygen is due solely to the carbon dioxide, a measurement of the carbon dioxide present in the sample is obtained. This is accomplished by conducting a sample of the gas via conduit 17 to a first input 27 of oxygen gauge means 30. The sample is also conducted via conduit 18 to the carbon dioxide treatment means 32 which provides a comparison gas to a second input 34 of the oxygen gauge means 30.

The oxygen gauge means 30 may comprise two separate oxygen gauges, one connected to input 27 and the other connected to input 34 for measuring the oxygen content of the gas applied to it as evidenced by the partial pressure of oxygen in the gas. Alternatively and preferably the oxygen gauge means 30 comprises an oxygen gauge which measures the difference in oxygen partial pressures of the gases supplied to the first and second inputs 27 and 34. One such type of differential oxygen gauge is described and claimed in copending application Ser. No. 279,466 filed May 10, 1963 and now U.S. Pat. No. 3,347,767 by William M. Hickam and assigned to the assignee of the present invention.

Since the increase in oxygen partial pressure at input 34 over the oxygen partial pressure at input 27 is due to the carbon dioxide in the sample, the result of the oxygen gauge measurement is directly correlated to the carbon dioxide and accordingly a readout means 36 is provided and may be calibrated directly in carbon dioxide content units. After the analysis, the untreated sample gas appears at first output 38 to be fed back into the system via conduit 20 and the comparison gas appears at second output 40 and is fed back into the system via conduit 21.

The various conduits illustrated may be formed or drilled in a solid block of material or may be comprised of individual tubing, and depending upon the application of the sensor apparatus, the inside diameter of the tubing may be chosen to govern flow rates within a certain range. Since a very small sample of gas is needed to determine the carbon dioxide content, the conduits such as 17 and 18 may be in the form of capillary tubes such as to provide in conjunction with the pressure drop from A to B, a flow rate, for example of several hundred cc. per hour, although the operation of the oxygen gauge means 30 is independent of flow rates.

Figure 2:
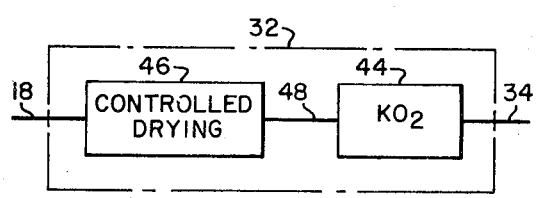
FIG. 2 is a block diagram illustrating a portion of FIG. 1 in somewhat more detail.

Various arrangements may be provided to treat the carbon dioxide to provide a related amount of oxygen, one arrangement being chemical in nature wherein oxygen is released as an end product by a chemical reaction involving carbon dioxide, and to this end reference is made now to FIG. 2.

FIG. 2 illustrates the carbon dioxide treatment means 32 of FIG. 1 in somewhat more detail and includes components for a chemical reaction with the carbon dioxide entering at conduit 18. The chemical reaction involves the use of a metallic super oxide such as potassium super oxide within the container 44. The gas entering conduit 18 may, in addition to the carbon dioxide, include nitrogen, oxygen, and water vapor. Controlled drying means 46 is provided in order to pass a controlled amount of water vapor. This may be done chemically such as with the provision of a dessicant, calcium chloride being one example. Depending upon the application, the controlled drying means 46 may include heating means for maintaining the dessicant at a certain operating temperature or within certain operating temperature ranges. The sample gas provided at conduit 48 having a controlled amount of water vapor reacts with the potassium super oxide in the following equivalent manner:

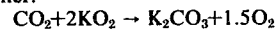
$$CO_2 + 2KO_2 \rightarrow K_2CO_3 + 1.5O_2$$

and it is seen that 1.5 moles of oxygen is the related amount of oxygen released for each mol of carbon dioxide absorbed. It is believed that the above chemical equation is the resultant of several independent reactions such as follows:

$$H_2O + 2KO_2 \rightarrow 2KOH + 1.5O_2$$
$$2KOH + CO_2 \rightarrow K_2CO_3 + H_2O$$

As seen in the last two equations, it is assumed that water vapor reacts with the potassium super oxide yielding potassium hydroxide and oxygen, and that the potassium hydroxide reacts with carbon dioxide to yield potassium carbonate and water vapor which in turn reacts with the potassium super oxide etc. Although these equations may be the results of further independent equations it is felt that the initial equations set forth suffice to demonstrate the chemical reaction since in actuality, the end product of the reaction is oxygen and potassium carbonate.

Figure 3:
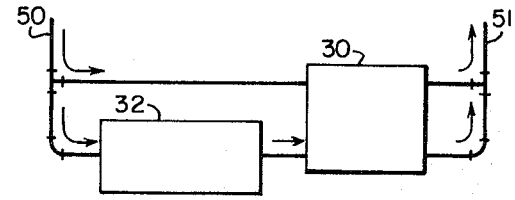
FIGS. 3–5 illustrate various arrangements of the apparatus.

Since the nitrogen and oxygen entering at conduit 18 are not involved in the chemical reaction, the comparison gas at 34 includes the original nitrogen and oxygen in the sample. Thus an added amount of oxygen results from the conversion of the carbon dioxide to an equivalent of oxygen. FIG. 1 is illustrative of one type of gas flow arrangement; obviously other arrangements may be utilized without departing from the teachings herein. By way of example, FIG. 3 illustrates an arrangement which includes only single conduits 50 and 51 for connection to the atmospheric closed system and wherein conduit 50 conveys a sample of the gas which is then provided to the oxygen gauge means 30 and the carbon dioxide treatment means 32. The outputs of the oxygen gauge means 30 are connected together to form a single conduit 51.

Figure 4:
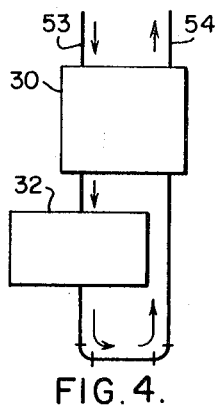

In FIG. 4, the conduit 53 conveys the sample gas to one input of the oxygen gauge means 30 the first output of which is fed to the carbon dioxide treatment means 32 after which the comparison gas provided thereby is fed to the oxygen gauge means 30 and is exited by means of conduit 54.

Figure 5:
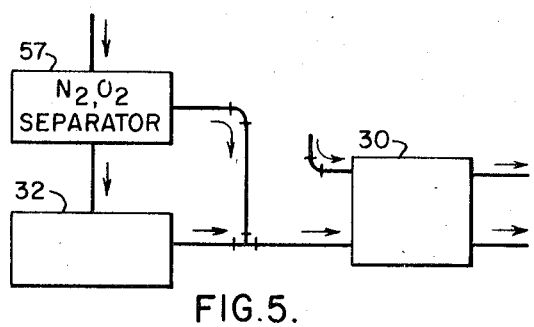

In FIG. 2, there was illustrated an arrangement whereby the sample of gas including the nitrogen and oxygen therein was passed through the potassium super oxide 44; obviously other gas flow arrangements and components may be utilized. By way of example, in FIG. 5, there is illustrated an arrangement which may include means 57 for separating nitrogen and oxygen from the entering sample gas. It then provides the resultant carbon dioxide and water vapor gas to the treatment means 32. After treatment in the carbon dioxide treatment means 32 the exiting gas is combined with the separated nitrogen and oxygen from the separator 57 to form one input to the oxygen gauge means 30.

Although the present invention has been described with a certain degree of particularity, it should be understood that the present disclosure has been made by way of example and that modifications and variations of the present invention are made possible in the light of the above teachings.

What is claimed is:

1. Apparatus for determining the carbon dioxide content of a carbon dioxide bearing gas, comprising:
    A. first means for obtaining a sample of said gas;
    B. second means operatively associated with said first means and responsive to carbon dioxide in said sample for providing a comparison gas containing a related amount of oxygen and
    C. a differential oxygen gauge operatively associated with said first and said second means for simultaneously comparing said sample and said comparison gases for obtaining the difference in oxygen partial pressures of said gases.

2. Apparatus according to claim 1 wherein said first means includes:
    A. a passageway through which the gas to be tested is passed;
    B. a restricted area in said passageway for providing a difference in pressure on either side of said restriction;
    C. sample gas input conduit means connected to the higher pressure side of said restriction;
    D. gas output conduit means connected to the lower pressure side of said restriction; and wherein
    E. said second means and said differential oxygen gauge constitute a gas analysis section located between, and connected to, said gas input and gas output conduit means.

3. Apparatus according to claim 2 wherein:
    A. said conduit means comprise capillary tubes.

4. Apparatus according to claim 1 wherein said second means includes:
    A. means for reacting the carbon dioxide chemically to provide the related amount of oxygen.

5. Apparatus according to claim 4 wherein:
    A. said chemical reaction includes a reaction with a metallic superoxide.

6. Apparatus according to claim 5 wherein:
    A. said metallic superoxide is potassium superoxide.

7. Apparatus according to claim 5 which includes:
    A. means for removing water vapor from the sample.

* * * * *